United States Patent [19]

Kunzfeld

[11] Patent Number: 4,483,185

[45] Date of Patent: Nov. 20, 1984

[54] APPARATUS FOR CHECKING VALVE CLEARANCE OF THE INLET AND EXHAUST OF A PISTON ENGINE

[75] Inventor: Wilhelm Kunzfeld, Graz, Austria

[73] Assignees: Avl Gesellschaft Fur Verbrennungskraftmaschinen Und Messtechnik m.b.H.; Prof.Dr.h.c. Hans List, both of Graz, Austria

[21] Appl. No.: 492,653

[22] Filed: May 9, 1983

[30] Foreign Application Priority Data

May 12, 1982 [AT] Austria ................................ 1872/82

[51] Int. Cl.[3] .......................................... G01M 15/00

[52] U.S. Cl. .................................................. 73/117.2

[58] Field of Search .................... 73/116, 117.2, 117.3, 73/118, 119 R; 364/551

[56] References Cited

U.S. PATENT DOCUMENTS 4,370,884 2/1983 Woss et al. ........................ 73/116 X 4,389,882 6/1983 Noro et al. ............................ 73/118

*Primary Examiner*—Jerry W. Myracle

*Attorney, Agent, or Firm*—Watson, Cole, Grindle & Watson

[57] ABSTRACT

An extraneously driven piston engine is fitted in the region of its valve gear with solid-borne vibration pick-ups which are connected to a processor unit. An angle-mark transmitter on the crank assembly controls a gate circuit which within specified zones of crank angle, feeds the vibration signals into a limit-value circuit which, by a comparison of levels, provides a "good/-bad" information read-out.

10 Claims, 5 Drawing Figures

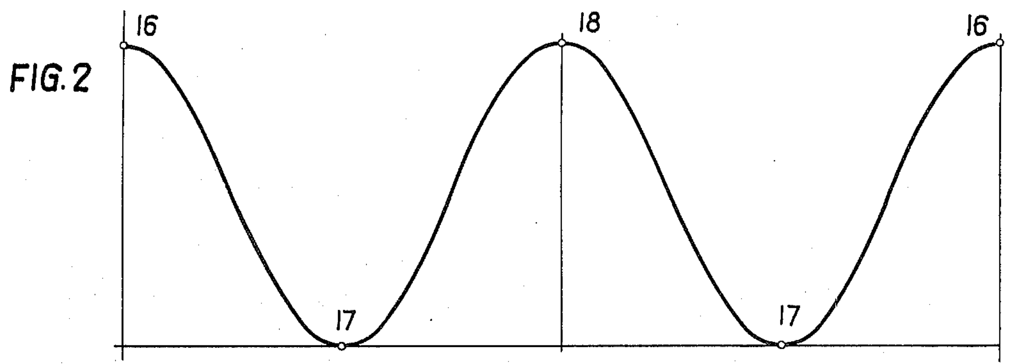
FIG. 2
16
18
16
17
17
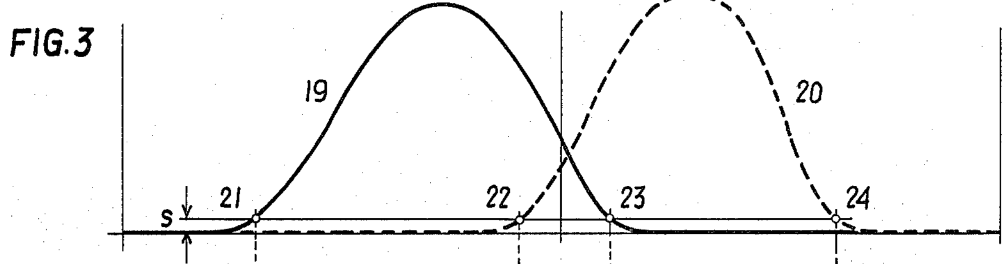
FIG. 3
19
20
S
21
22
23
24
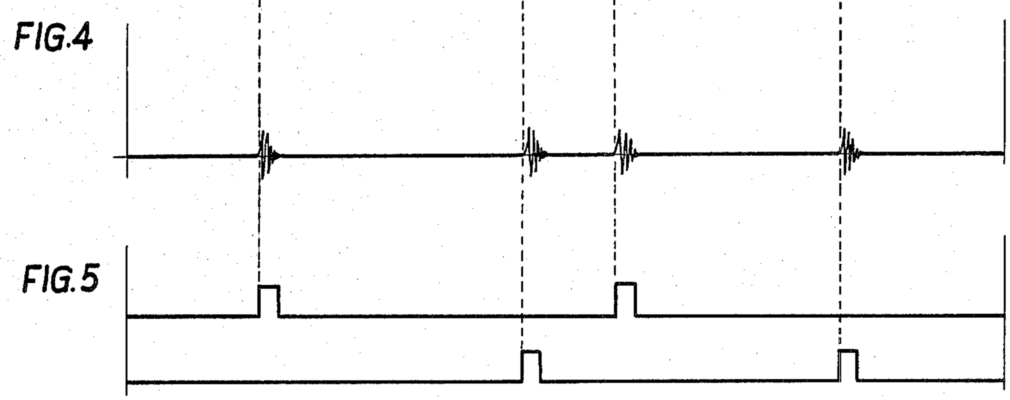
FIG. 4
FIG. 5

APPARATUS FOR CHECKING VALVE CLEARANCE OF THE INLET AND EXHAUST OF A PISTON ENGINE

BACKGROUND OF THE INVENTION

The present invention relates to an apparatus for checking the valve clearance of the inlet and exhaust valves of a piston engine.

Correctly adjusted valve-clearances are very important in piston engines because they very largely determine the wear in the valve gear which, when it exceeds certain tolerances, gives rise to malfunctions, loss of performance and the like.

DESCRIPTION OF THE PRIOR ART

Normally valve clearances are checked manually with the aid of feeler gauges consisting of thin blades of metal of different thicknesses which, for clearance checking purposes, are inserted directly between, for example the base circle of the cam and the actuating face of a cup-tappet, or between other appropriate cooperating parts of the valve gear. The actually existing valve clearance is then judged by the thickness or gauge of the respective feeler blade which can still, or no longer, be inserted freely in the existing gap. Naturally this check must be carried out while the engine is not functional and after making the valve gear accessible, which has the disadvantage, on the one hand, that any variations in valve clearance which may occur due to tensions or motion influences in the functional operation of the piston engine cannot be detected by this method and, on the other hand, that the checking or testing operation requires relatively much preparatory work and labor which is undesirable, for example in the routine-tesing of installed piston engines.

SUMMARY OF THE INVENTION

It is an aim of the present invention to provide an arrangement for checking or testing the valve clearances of the inlet and exhaust valves of a piston engine which in a simple manner allows quick and reliable information to be obtained concerning the individual valve clearances, which actually exist, while largely avoiding the need for further assembly or stripping work on an installed piston engine.

The present invention has arisen from the consideration that the metallic noises which occur when the valves open and close—during valve-opening these noises being mainly caused by the final velocity of impact between the two corresponding elements of the valve gear which value depends on the value of existing valve clearance, while during valve-closing such noises are mainly generated by the final velocity of impact of the valve head relative to the associated valve seat—are time-staggered by a length of time which is directly associated with the size of valve clearance relative to the theoretical valve opening and closing times which are known from the crank-angle and cam-diagrams. On the basis of this consideration, the present invention resides in that for the purposes of carrying out the checking operation the piston engine is extraneously driven, that at a predetermined point in the region of the valve gear at least one vibration-pick-up is applied to the surface of the piston engine to record solid-borne vibrations, the pick-up being connected to a processor unit and feeding into this unit signals which correspond to solid-borne vibrations occurring at its mounting site, that an angle-mark transmitter is provided on the crank assembly of the piston engine and is connected to the processor unit and in co-operation therewith issues reference signals corresponding to at least one defined angular position of the crank assembly, that the processor unit comprises a gate circuit which, triggered by the reference signals of the angle-mark transmitter, is open, at least within the time zone, known from the crank angle diagram, of one of the two end points of each valve movement, in respect of the received solid-borne vibration signals, and that the signals which pass through the gate circuit are applied to a limit-value-circuit associated with the processor unit which, by a comparison of levels with at least one trigger level provides a "good/bad" read-out in an associated indicator unit.

The European patent application which was published under number 31 806 describes a device for the functional testing of valves in piston engines, in which microphones are arranged in the inlet and exhaust ducts of the piston engine which is extraneously driven for the purposes of such functional testing, and the signals which mainly stem from the hissing noises of leaking valves are applied to a gate circuit which is controlled in relation with the crank angle of the piston engine. However, on the strength of the utilization of air-transmitted sound signals which is favorable in the context of valve leak-testing according to this known arrangement, no data can be obtained concerning the magnitude of valve clearance because of the implicit relatively long travel times of the signals from their generation to their reception. Even for ascertaining the actual timing of the valves—an operation which in principle can be performed with this known arrangement—for each valve it is necessary to take off the associated inlet and exhaust manifolds and to fit respectively associated microphones at the orifices on the cylinder head with the aid of relatively expensive adapters.

By adopting the above described provisions according to the present invention, on the other hand, it is possible even with one single solid-borne vibration pick-up which can be quite easily fitted on the piston engine without further assembly or dismantling, to pick up solid-borne vibration signals which, owing to their very brief travelling time are also suitable for the determination of very small time-differences such as occur in the deviations of valve clearances. In such an arrangement the windows in the gate circuit may be set in such a manner that the points in time which are known from the crank-angle diagram or cam diagram, taking into account also the ideal valve clearance values, will be at the start of the open range because this brings all those noises which are generated at this point in time directly into the open range of the gate circuit so that a relatively high signal level can be registered.

Basically the checking of one of the two end points of valve movement, that is to say of the opening—or of the closing noise—would be sufficient for checking valve clearance because a badly adjusted valve clearance naturally produces the same effect during opening as during closing of the valve. However, if both end points of valve movement are monitored in accordance with the present invention a greater degree of accuracy can be obtained and it is easier to rule out faults.

According to a further embodiment of the invention the limit-value circuit comprises two trigger levels for each window of the gate circuit, the first trigger level being above the base level existing without valve noise and the second trigger level being above the maximum level originating from one single valve. This enables separate testing as to whether in that crank-angle region within which the corresponding noise should appear in the presence of correctly adjusted valve clearance there is any noise level at all which is above the basic noises or whether in this region the noise level of a single valve is being exceeded. Should the first level check have a negative result it can be concluded that the valve clearance of the particular valve is wrongly adjusted, in other words, that the opening or closing noise appears too early or too late. If the second level check has a positive result this means that in the observed crank-angle range the noise occurs of not just one but of at least one further valve, which likewise indicates wrongly adjusted valve clearance. If all valve clearances in the whole engine were correctly adjusted therefore, the first level check would produce in all windows of the gate circuit a positive, and the second level check a negative result.

According to another attractive embodiment of the invention the limit-value-circuit is preceded by a signal rectifier and associated integrator which increases the intensity of the signal which is available for the level comparison and thereby improves accuracy.

In a further attractive embodiment of the invention provision is made for the open zones of the gate circuit, which is triggered by the reference signals of the angle-mark transmitter, to be adjustable in respect of their position relative to each other as well as in respect of their respective width, the adjustment being made in the processor unit and special advantages being obtained if the trigger level is separately adjustable for each and every window in the gate circuit. These provisions enable easy adaptation without problems of the apparatus according to this invention to various types of piston engines to be tested which naturally may involve different valve timing data.

DESCRIPTION OF THE DRAWINGS

The present invention is hereinafter more particularly described with reference to the enclosed drawings in which:

FIG. 2 shows the piston stroke curve of one single cylinder of the engine shown in FIG. 1, FIG. 3 shows the camlift curves associated with FIG. 2, FIG. 4 shows the solid-borne-vibration signals which occur, and FIG. 5 shows the signals which control the gate circuit of the processor unit according to FIG. 1.

DESCRIPTION OF THE PREFERRED EMBODIMENT

Figure 1:
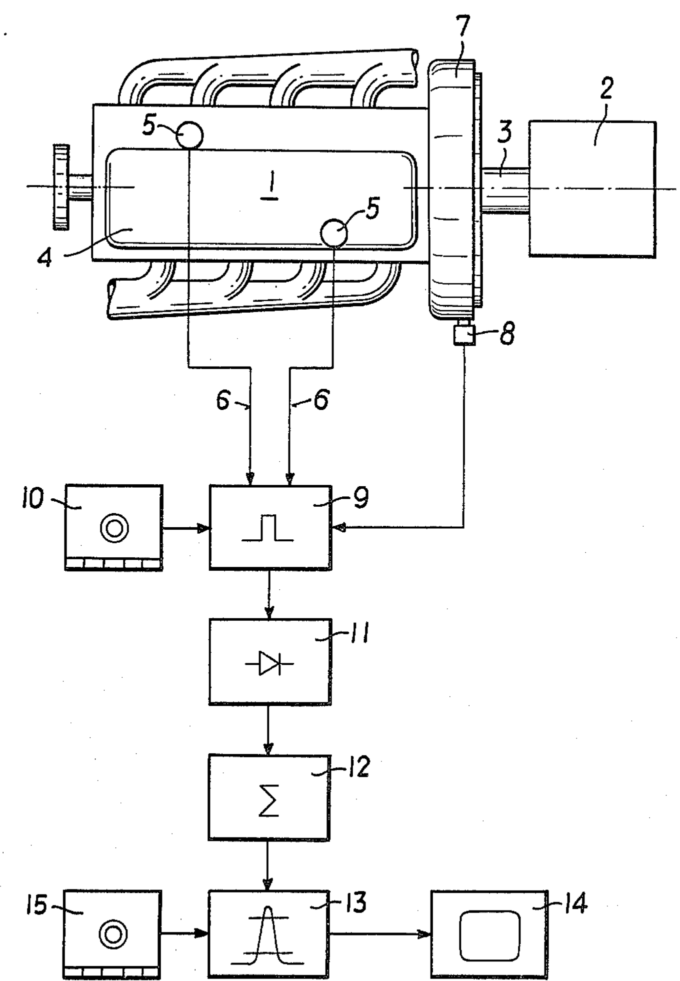
FIG. 1 shows a schematic representation of an embodiment of apparatus according to this invention.

For valve-clearance testing purposes a four-cylinder internal combustion engine 1 represented in FIG. 1 is driven extraneously by a separate motor 2 with the aid of a coupled drive transmission shaft 3. At each of two predetermined points in the region of a valve gear 4 there is arranged a vibration pick-up 5 to record solid-borne vibrations at the surface of the internal combustion engine 1, each pick-up being connected by a lead 6 to a processor unit which it feeds with signals corresponding to solid-borne vibration occurring at the place where it is fitted. Naturally the illustrated positional sites of the vibration pick-ups 5 are freely variable to suit given conditions; also, in certain circumstances it is possible to work with just one, or else with more than two, vibration pick-ups.

On a flywheel 7 of the engine 1 there is arranged an angle-mark transmitter 8 which is connected to the processor unit and in cooperation therewith delivers reference signals corresponding to at least one defined angular position of the crank assembly of the internal combustion engine.

The processor unit comprises a gate circuit 9 which, triggered by the reference signals of the angle-mark transmitter 8, is open to the solid-borne vibration signals arriving via leads 6 at least within the time-range, known from the crank-angle diagram of the internal combustion engine, of one of the two end points of each valve displacement. The "open" regions of the gate circuit 9 which is triggered by the reference signals of the angle-mark transmitter 8 are adjustable by means of an adjusting unit 10 in respect of their relative position as well as with regard to their respective widths.

In the described embodiment the signals of the vibration pick-ups 5 which pass through the gate circuit 9 are passed through a rectifier circuit 11 and an integrator 12 to a limit-value-circuit 13 which, by level comparison against two trigger levels provides a "good/bad" statement or readout in an associated indicator device 14. The trigger levels in the limit-value circuit 13 are separately adjustable in respect of their level value for each window of gate circuit 9 by means of an adjusting unit 15.

In this context it should also be mentioned that the manner in which the function of the individual component devices hereinafter described is actually put in practice is not critical—components and units of this kind are part of the state of the art—and for the purposes of the present invention it is equally immaterial whether the said units or circuit components and groups are put in practice in terms of hardware or software.

The function of the arrangement according to this invention will be hereinafter more particularly described with reference to the explanatory diagrams shown in FIGS. 2 to 5—all of which, for the sake of simplified representation, relate to one single cylinder of the internal combustion engine 1 according to FIG. 1 only.

FIG. 2 shows the piston stroke curve between two ignition, top dead centers 16—that is to say for one complete cycle of a four-stroke engine; between the two ignition top dead centers 16 the two bottom dead centers 17 and the change-over top dead center 18 are indicated. In the representation according to FIG. 3 the associated lift curves are shown of the valve-actuating cams, 19 being the lift curve associated with the exhaust valve and 20 the lift curve associated with the inlet valve.

Owing to valve clearance s (FIG. 3) in the valve gear the actual opening point 21 of the exhaust valve and 22 of the inlet valve occurs somewhat later by comparison with the associated commencement of cam lift and the actual closing point 23 of the exhaust valve and 24 of the inlet valve is somewhat earlier in time relative to the termination of cam lift. For this reason there is, on the one hand, a final relative velocity between the parts which have the valve clearance s at the start of valve actuation and, on the other hand, the application of the valve head to the valve seat occurs at a final velocity which, due to the mutual impact of the corresponding metallic parts gives rise to noises which can be clearly identified. These noises are shown in FIG. 4 corresponding to the representation of FIG. 3, in the form of solid-borne vibration signals, for example as recorded by means of the vibration pick-ups 5 according to FIG. 1.

By means of the gate circuit 9 which is synchronized with the angle-mark transmitter 8, for example at signal repeat sequences corresponding to FIG. 5, the signals issued by the pick-ups 5 which arrive within the "open" time zone are fed into a rectifier circuit 11, whereafter the rectified signal amplitudes are accumulated in integrator 12 during the "open" period of the corresponding windows. The summation signals which are maintained at the integrator 12 for a certain predeterminable length of time following the closing of the windows are then checked in the limit-value circuit 13 against two trigger levels, the lower of these trigger levels being arranged, for example, above the basic level which exists without any valve noise at all, and the upper trigger level being higher than the maximum level of noise caused by one single valve. The limit-value circuit 13 therefore provides in this case two statements about exceeded level values which can be utilised in the indicator unit 14 to provide a "good/bad" read-out in respect of valve clearance.

As a variation from the described apparatus it would also be possible to test only one of the two end points of each valve movement—that is to say, either the opening or the closing point—because, as will be observed directly from FIG. 3, a shift in the value of valve clearance s produces the same effects during opening and closing of the valve. The above-described method of checking both terminal points of valve movement, however, enables a more accurate and fault-excluding statement to be obtained in respect of existing valve clearance.

If existing valve clearance s deviates from an ideal value which latter is pre-set by the position of the windows which are opened in the gate circuit 9 (see FIG. 5), this will show up directly in the signal which is eventually compared in the limit-value-circuit 13 with the pre-set trigger levels, thus affording information as to whether the valve clearance actually existing is tolerable or not.

Within the scope of the present invention it would also be conceivable, if no corresponding signal is received within the gate circuit windows which indicate correctly adjusted valve clearance, to shift these windows by a small amount in time or degree of crank-angle in order thereby to obtain information as to whether existing valve clearance is too small or too large. This could be done, for example, by means of the adjusting unit 10, if required.

The indicator unit 14 may also enable a general overall valuation to be obtained in respect of the valve gear due to the provision in said unit of memories for storing the informations obtained from the comparison of levels within the range of the individual windows which, for example after a run through several crank cycles enables mean values to be formed and so improves measuring accuracy.

I claim:

1. An apparatus for checking valve clearance of the inlet and exhaust valves of a piston engine being extraneously driven for the purposes of carrying out the checking operation, said apparatus comprising at least one vibration-pick-up which is applied to the surface of the piston engine at a predetermined point in the region of a valve gear thereof to record solid-borne vibrations, a processor unit, said pick-up being connected to said processor unit and feeding into said unit signals which correspond to solid-borne vibrations occurring at its mounting site, an angle-mark transmitter provided on a crank assembly of said piston engine, said transmitter is connected with said processor unit and in co-operation therewith issues reference signals corresponding to at least one defined angular position of said crank assembly, said processor unit comprises a gate circuit which, triggered by said reference signals of said angle-mark transmitter, is open in respect of the received solid-borne vibration signals at least within a time zone, known from the crank angle diagram of said engine, of one of the two end points of each valve movement, and wherein a limit-value-circuit is provided, which is associated with said processor unit and an indicator unit, said limit-value-circuit, by a comparison of levels with at least one trigger level, provides a "good/bad" information read-out in said indicator unit.

2. An apparatus according to claim 1, wherein said limit-value circuit comprises two trigger levels for each window of said gate circuit of which a first trigger level is higher than a base level existing without valve noises and a second trigger level is higher than a maximum level due to one single valve.

3. An apparatus according to claim 2, wherein the level value of said trigger levels is separately adjustable for each window of said gate circuit.

4. An apparatus according to claim 2, further comprising a signal rectifier and an associated integrator which are included before said limit-value circuit.

5. An apparatus according to claim 2, wherein the open zones of said gate circuit which is triggered by said reference signals of said angle-mark transmitter are adjustable in said processor unit as to their respective relative positions and also in their respective width.

6. An apparatus according to claim 1, further comprising a signal rectifier and an associated integrator which are included before said limit-value circuit.

7. An apparatus according to claim 6, wherein the open zones of said gate circuit which is triggered by said reference signals of said angle-mark transmitter are adjustable in said processor unit as to their respective relative positions and also in their respective width.

8. An apparatus according to claim 6, wherein the level value of said trigger levels is separately adjustable for each window of said gate circuit.

9. An apparatus according to claim 1, wherein the open zones of said gate circuit which is triggered by said reference signals of said angle-mark transmitter are adjustable in said processor unit as to their respective relative positions and also in their respective width.

10. An apparatus according to claim 9, wherein the level value of said trigger levels is separately adjustable for each window of said gate circuit.

* * * * *

UNITED STATES PATENT OFFICE
CERTIFICATE OF CORRECTION

PATENT NO. : 4,483,185

DATED : November 20, 1984

INVENTOR(S) : Wilhelm Kunzfeld

It is certified that error appears in the above-identified patent and that said Letters Patent are hereby corrected as shown below:

On the title page assignee should read

-- (73) Assignee: AVL Gesellschaft für Verbrennungskraft-maschinen und Messtechnik mbH. Prof. Dr. Dr. h.c. Hans List, Graz, Austria --

This Certificate supersedes certificate of correction issued June 4, 1985.

Signed and Sealed this

*Fourth* Day of *February 1986*

[SEAL]

*Attest:*

DONALD J. QUIGG

*Attesting Officer* *Commissioner of Patents and Trademarks*